United States Patent [19]

Marshall et al.

[11] 4,182,850
[45] Jan. 8, 1980

[54] NON-SOLVENT PRECIPITATION OF POLYMER COMPOSITION

[75] Inventors: Cary S. Marshall, Danville; Robert S. Steffanson, Concord, both of Calif.

[73] Assignee: The Dow Chemical Company, Midland, Mich.

[21] Appl. No.: 861,609

[22] Filed: Dec. 19, 1977

[51] Int. Cl.$^2$ .......................... C08J 3/14; C08G 63/62
[52] U.S. Cl. .................................. 528/480; 528/196; 528/370; 528/491; 528/498
[58] Field of Search ................. 260/47 XA; 528/197, 528/196, 201, 370, 372, 480, 491

[56] References Cited
U.S. PATENT DOCUMENTS

| | | | |
|---|---|---|---|
| 3,035,020 | 5/1962 | Fry | 260/47 XA |
| 3,036,036 | 5/1962 | Howe | 260/47 XA |
| 3,214,407 | 10/1965 | Butterworth | 260/47 XA |
| 3,264,262 | 8/1966 | Baker et al. | 260/47 XA |
| 3,264,263 | 8/1966 | Baker | 260/47 XA |
| 3,264,264 | 8/1966 | Baker | 260/47 XA |
| 3,267,074 | 8/1966 | Wood | 260/47 XA |

OTHER PUBLICATIONS

Polycarbonates; E. D. Oliver; Stanford Research Institute Report No. 50; pp. 26-33, Apr. 1969.
Polycarbonates; E. D. Oliver; Stanford Research Institute Report No. 50A Supplement, pp. 32-37, Sep. 1975.

Primary Examiner—Wilbert J. Briggs, Sr.
Attorney, Agent, or Firm—G. D. Street

[57] ABSTRACT

Production of polycarbonate or phenolphthalein polycarbonate copolymers and method for recovery of solid copolymer from solution.

8 Claims, 1 Drawing Figure

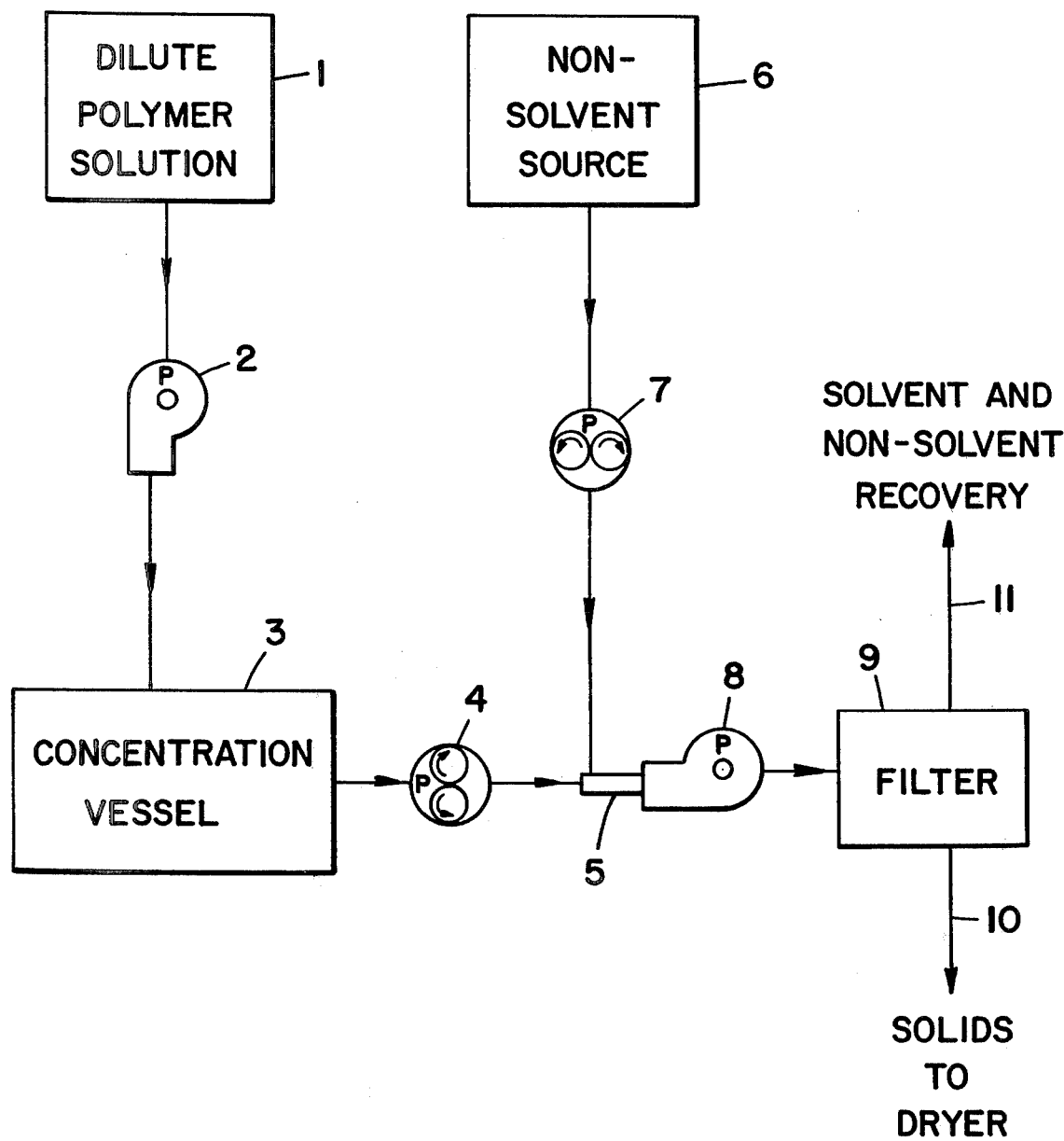

NON-SOLVENT PRECIPITATION OF POLYMER COMPOSITION

BACKGROUND OF THE INVENTION

This invention is directed to the preparation of polycarbonate polymers or phenolphthalein polycarbonate copolymers and to a method for the recovery of the same in solid form from solutions containing the same.

Polycarbonates are well known in the art and can be prepared according to a variety of processes. Phenolphthalein-polycarbonate copolymers are also known and have been described, for example, in U.S. Pat. No. 3,036,036 and in an article by P. W. Morgan (Journal of Polymer Science: Part A, Vol. 2, page 437 (1964)). Methods for recovering polycarbonates from solutions by non-solvent precipitation are known and are set forth in U.S. Pat. No. 3,267,074. The improved process of the U.S. Pat. No. 3,267,074 reference concerns concurrently contacting in a high speed shearing chamber a polycarbonate solution and a turbulent stream of polycarbonate non-solvent having a Reynolds number of at least 1,500 and being heated above the boiling point of the polycarbonate solvent. The resulting mixture is then passed to a flash drum containing non-solvent maintained at a temperature above the boiling point of the polycarbonate solvent to remove the polycarbonate solvent, leaving a polycarbonate non-solvent slurry, from which the polycarbonate solid can be obtained. However, in such process, it is required that the solids be maintained in the system for a comparatively long residence time and that the non-solvent is heated above the boiling point of the polycarbonate solvent so that ample heat is available at the point of feed injection, thus avoiding the sudden drop of temperature that would otherwise occur on flashing of the polycarbonate solvent. Also, a two-step process of contacting the polymer with non-solvent is required to separate the polycarbonate solvent from the polymer.

Consequently, it is an object of this invention to provide an improved method for recovering polycarbonates in solid form from a solution containing the same.

SUMMARY OF THE INVENTION

Briefly, the invention concerns a process for recovering a polycarbonate polymer from a solution comprising the same by concurrently contacting said solution with a turbulent stream of a polycarbonate non-solvent in a shearing device to thereby form a mixture having suspended therein fine, discrete solid particles of the polymer, which are thereafter recovered from the solution. The process of the present invention provides effective precipitation and recovery of polycarbonate polymers, which tend to form a solvated or sticky mass, which apparently result when a narrow range of solvent concentration is encountered during removal of the same by contact with a non-solvent.

DETAILED DESCRIPTION OF THE INVENTION

The present invention provides a method for recovering solid polycarbonate polymer from a polycarbonate-solvent solution which comprises introducing concurrently into a high speed shearing chamber a stream of said solution and a turbulent stream of a non-solvent for said polycarbonate polymer, said non-solvent being maintained at a temperature which does not exceed the boiling point of the polycarbonate solvent, to form a mixture comprising solid polycarbonate polymer particles, solvent and non-solvent and thereafter separating said solid particles from said solvent and non-solvent. The process of the present invention is particularly adapted to the recovery of phenolphthalein polycarbonate polymers (hereinafter referred to as "PPC" or "PPC's"), and the invention will hereinafter be described with reference to the same. However, it is understood that the following is equally applicable to the treatment of polycarbonate polymers as well.

As noted previously, various methods are known for producing PPC's and PPC solutions. One method, for example the solution process, involves the phosgenation of a mixture of phenolphthalein, a dihydroxy aromatic compound, such as para-bisphenol A, para t-butylphenol (as a chain terminator), pyridine, which acts as a catalyst and HCl acceptor, and a solvent such as methylene chloride under conditions known in the art. Following the completion of the reaction, the pyridine can be extracted with hydrochloric acid, having a PPC-methylene chloride solution which can be treated according to the present invention. The desired PPC-solvent mixture for treatment herein can also be obtained by the well-known interfacial process.

Various solvents are employed in the processes for making PPC's and they constitute a large proportion of the PPC solution produced. Representative solvent media include, for example, methylene chloride, chloroform, 1,1,2-trichloroethane, dioxane, tetrahydrofuran, nitrobenzene, thiophene and the like. Non-solvents which can be employed alone or in mixtures in the present invention include, for example, hydrocarbons such as hexane, heptane, iso-octane, various isopars and the like as well as freons such as, for example, 1,1,2-trichloro-1,2,2-trifluoroethane, trichlorofluoromethane and the like. The non-solvent employed is maintained at a temperature which does not exceed, i.e., is equal to or below, that of the boiling point of the polycarbonate solvent employed; preferably, the temperature is maintained below that of the boiling point of the polycarbonate solvent. Superatmospheric pressures can also be employed to prevent volatilization of low boiling point non-solvents. The choice of solvent and non-solvent is otherwise a matter of choice or expediency, it only being important that the solvent and non-solvent employed be immiscible with each other in order to provide the desired solvent separation and PPC precipitation effect. While preferred as a non-solvent in prior art methods for the treatment of polycarbonate solutions, it has been found that water does not provide for satisfactory removal of solvent from PPC solutions and precipitation of polymer solids and is therefore not employed as a non-solvent in the present invention.

Generally, in carrying out the process of the present invention, the PPC solutions to be treated may vary from about 1% to about 40% or more by weight PPC. Homogeneous polymer solutions should be utilized. For purposes of commercial expediency and practicability, it is usually preferred to treat solutions ranging from about 5% to about 12% by weight PPC. In one embodiment of the invention, PPC solutions prepared by phosgenating phenolphthalein and bisphenol A are preferably treated. In a further embodiment, a polymer solution prepared by phosgenating bisphenol A is preferably treated. In another preferred embodiment, PPC compositions containing from about 5 to about 70 mole weight % phenolphthalein are treated according to the invention. The ratio of PPC solution to non-solvent generally ranges from about 1:2 to about 1:20; preferably, ratios of from about 1:3 to about 1:6 are employed. The temperature at which the process is carried out will be dictated by the choice of non-solvent and boiling point thereof.

The present invention provides a method for the continuous stripping of solvent from a PPC solution and the precipitation and recovery of PPC therefrom. Sufficient agitation or shearing of the PPC solution and non-solvent is necessary to obtain a solution having suspended therein finely divided, discrete solid particles of the PPC. This shearing is also necessary to prevent and/or break any solvated mass which may form upon contact of the PPC solution and non-solvent and to insure satisfactory contact of the non-solvent with the PPC. If there is insufficient shearing of the PPC solution, the resulting PPC product will be a sticky mass which is difficult to break, even with excessive amounts of agitation (such as with a Waring blender), and which builds up on the agitator blades and shaft. Devices thus employed in the present invention must provide sufficient shear to precipitate the PPC from the polymer solution to obtain a mixture having solid, discrete particles of the PPC suspended therein. Preferably, the recovered PPC solid is a non-gummy, finely divided, powdered solid, e.g., of talc-like consistency.

The shearing device used herein may be a high shear pipe line mixer or a centrifugal pump with an impeller altered for high shear or to be driven backwards or solution fed thereto in a reverse manner. Where the shearing device is a pump, it should generally provide an operational speed of at least about 300 rpm. Thus, for example, a centrifugal pump having an impeller of about 6" in diameter will have a tip speed of about 450 ft/sec when operated at about 300 rpm. Those skilled in the art can, by simple trial run, determine what particular operational speed will be needed. Hence, any speed or any device which imparts sufficient shearing action upon the PPC solution to precipitate solid PPC as described above is intended to be encompassed within the spirit of this invention. Some of the devices that may be used include those such as Eppenbach Dispersators and the like. Mechanical shearing devices, such as centrifugal pumps, for example, an Eastern Model DA centrifugal pump, are preferably employed. Where a centrifugal pump having normal rotation is employed, the PPC solution and non-solvent stream are fed (separately) into the discharge side of the pump and the resulting mixture passed to the suction side and out through the inlet of the pump. Reverse rotation of the pump with PPC solution and non-solvent fed to the normal inlet is also contemplated.

Regardless of the particular device employed, at least one PPC solution stream and one non-solvent stream are separately introduced and not contacted until in the shearing chamber of the device employed. The non-solvent is introduced into the shearing chamber just prior to or simultaneously with the polymer solution stream. Concentric tube feed arrangements or separate inlets on the device periphery are thus among the means contemplated. Feed arrangements for the introduction of more than one stream of each of the polymer and/or non-solvent are also contemplated.

The non-solvent stream is ordinarily introduced at a sufficient flow rate to provide turbulent flow, as distinguished from laminar flow, at the point of introduction of PPC solution. The turbulence of the non-solvent at the point of PPC solution introduction can be calculated by what is commonly known as the Reynolds number (a detailed discussion of which can be found in "Chemical Engineers' Handbook" by John H. Perry) and a non-solvent liquid flow having a Reynolds number of at least about 1500 is employed in the present invention. The turbulence effected is desirable since it helps in reducing the formation of a solvated polymer mass as well as in maintaining the solid polymer in suspension once formed and after it leaves the shearing device. The residence time in the device is relatively short and is dependent upon a variety of conditions such as concentration, capacity of the system, polymer solution being treated, solvents, and the like. Generally, the PPC solution and non-solvent are introduced under pressures ranging from about 20 to about 40 psig or more. The exact pressure employed is, of course, dependent upon line sizes, back pressures of pumps, etc.

To further define the process of the invention, reference is made to the accompanying drawing. Although specific conditions or components may be mentioned in reference to the drawing, it is to be understood that the invention is not so limited to the same.

Referring to the drawing, a flow diagram of the process is illustrated, the elements including a dilute polymer solution source 1 which is passed by means of a centrifugal pump 2 to a concentration vessel 3 wherein the polymer solution is subjected to evaporation to concentrate the same to a desired level. The concentrated polymer solution is then pumped by means of a gear pump 4 to feed entry 5 attached to the discharge port of centrifugal pump 8, which is operated in a normal manner. Non-solvent from the non-solvent source 6 is similarly passed by means of gear pump 7 to the feed entry 5. The polymer solution and non-solvent are contacted and mixed in the discharge chamber of pump 8 whereby the desired polymer precipitate is formed. The resulting mixture is passed to the suction side of pump 8 and discharged through the normal inlet port thereof to a filter apparatus 9 wherein the precipitated polymer solids are separated from the mixture and fed to a dryer (not shown) while the filtrate is passed to devices (not shown) for the recovery of solvent and non-solvent components of the filtrate.

The design of feed entry 5 is essential in the respect that the polymer solution and non-solvent must not be contacted until they enter the shearing chamber of pump 8. Various means to prevent contact of the polymer and non-solvent feed streams will be readily apparent to those skilled in the art. Such means include separate feed entry pipes into the chamber, a concentric feed entry arrangement wherein a smaller pipe or conduit for separately feeding polymer solution to the shearing chamber is located within a larger pipe or conduit adapted to separately feed non-solvent to the shearing chamber, and the like. Preferably, a concentric feed entry is utilized wherein the inner conduit or pipe is adapted to feed polymer solution.

Further, as will be understood by those skilled in the art, the various pumps employed may, depending upon size, type, model, etc., vary in pitch, pump speed, etc., from time to time. Thus, where the centrifugal pump employed as the shearing or mixing device herein varies at times in speed, etc., and causes an irregular back pressure, or where variations in the operation of the non-solvent pump are experienced, it will be necessary to place a by-pass between the inlet and outlet ports of non-solvent pump 7 to compensate for any such irregularities. A metering valve and flow meter on the non-solvent feed line are also preferably employed. Since some gear pumps having graphite packing or the like may be damaged in use in the present invention or cause darkening of the polymer solids obtained, non-solvent gear pumps using teflon packing are recommended.

The following examples further illustrate preferred embodiments of the present invention.

EXAMPLE 1 n-hexane, at a rate of 400 ml/min is conveyed using a Viking gear pump to the discharge port of an Eastern Model DA centrifugal pump operated at approximately 3600 rpm. An 11% by weight solution of phenolphthalein (60 mole %)-bisphenol A (40 mole %) polycarbonate copolymer in methylene chloride is conveyed, using a Zenith gear pump, at a rate of about 130 ml/min to the same port through a concentric feed tube (so that contact of the hexane stream and the polymer solution stream is not made until both streams enter the pumping chamber). The pressure at which the hexane and polymer streams enter the centrifugal pump is from about 20 to about 30 psig. The resultant mixture consisted of a solution of n-hexane and methylene chloride having fine discrete solid particles of the copolymer suspended therein, the solid particles being subsequently obtained by filtration of the mixture and dried.

EXAMPLE 2

In a manner similar to that employed in Example 1, several runs were made with a phenolphthalein (70 mole %) polycarbonate (30 mole %) polymer solution (about 12% by weight) and Freon TF (1,1,2-trichloro-1,2,2-trifluorethane) non-solvent. Zenith gear pumps were used for the non-solvent stream and polymer stream and a centrifugal pump was used as the shearing device. At a volume ratio of polymer solution:non-solvent of about 1:2, some discrete solid polymer particles were formed but were somewhat sticky and tended to form a gummy mass. At a volume ratio of about 1:3.6, good formation of solid, discrete polymer particles was obtained. In another run, hot water (about 70° C.) was employed in place of the Freon TF as the non-solvent. In such operation, a sticky product mass was obtained. In another run using the same polymer solution at a polymer density of about 23% by weight and a polymer:Freon TF non-solvent volume ratio of about 1:3.6, the centrifugal pump initially clogged due to some unknown reason. However, after clean-out and resumption of the run, good solid, non-sticky polymer particles were obtained.

In subsequent trials some difficulties were experienced with the pump used to convey the non-solvent as well as with the centrifugal pump used as the shearing or precipitating device. The problems experienced were believed to lie in improper lubrication of the Zenith pump as well as an air driven B&S #1 gear pump and overloading of the electrical centrifugal pump, due to its small size.

EXAMPLE 3

In operations similar to the preceding Examples, a Viking gear pump powered by an electrical motor having a shaft rpm of about 1140 was used to pump an n-hexane non-solvent stream. A by-pass between the inlet and outlet streams was provided and a metering valve and flow meter were used to control the hexane flow rate to the shearing device, which was an air driven one-half horsepower Eastern centrifugal pump. The polymer solution was pumped to the shearing device with a Zenith gear pump driven by a variable speed motor. The polymer solution and n-hexane streams were separately fed to the discharge chamber of the centrifugal pump by means of a concentric conduit attached to the discharge port of the shearing device, the internal conduit of the concentric device being a ⅛" O.D. tubing through which the polymer solution is fed. In operations using such equipment, a polymer solution of phenolphthalein (10 mole %)-bisphenol A (90 mole %) in a methylene chloride solvent (11.3 weight % of polymer in solution) was utilized while n-hexane was employed as the non-solvent. The non-solvent was fed at a flow rate of about 490 ml/min at pressures varying from about 25 to about 50 psig while the polymer solution was fed at a rate of about 27 ml/min at a pressure of about 20 psig. The ratio of non-solvent to polymer solution, based on volume flow rate, was about 18:1. During the run, a total of about 18.3 liters of non-solvent and about 1.03 liters of polymer solution were fed. The solid polymer product obtained from such operation was in the form of a fine, non-sticky powder.

EXAMPLE 4

In operations using the same set-up, polymer solution, non-solvent and feed pressures as in Example 3 above, a total volume of about 53.4 liters of n-hexane (flow rate of 490 ml/min) and about 4.6 liters of polymer solution (flow rate of about 43 ml/min), at a feed volume ratio of polymer solution to non-solvent of about 1:11.5, were separately introduced into the discharge chamber of the centrifugal pump. The solid polymer product obtained upon filtration of the mixture exiting the pump was a finely divided, snow-white powder.

EXAMPLE 5

Other operations were carried out with similar equipment, polymer solution and non-solvent as in Example 3, except that a Moyno CDF-type gear pump powered by an electrical motor and that a polymer solution feed conduit tapering from ⅜" O.D. to 3/16" O.D. at the point of polymer solution exit into the pump discharge chamber were employed. The polymer feed conduit extended almost to the blades in the discharge chamber of the centrifugal pump. In four different runs, feed volume ratios of polymer solution:non-solvent of 1:4, 1:3.1, 1:2.6 and 1:2 were employed. The solid polymer products precipitated in such runs were solid, finely divided and relatively non-gummy. In subsequent runs at polymer solution:non-solvent ratios of 1:1.8 and 1:2.4, a good quality product was obtained but it was slightly gummy. The slight gumminess was believed to be the result of an inadequately mixed and homogeneous polymer solution.

In other operations employing similar equipment, good precipitation and formation of the desired solid polymer particles is obtained with other polymer concentrations, non-solvents, and non-solvent:polymer solution ratios.

What is claimed is:

1. A method for recovering solid polycarbonate polymer from a polycarbonate-solvent solution which comprises introducing concurrently into a high speed shearing chamber a stream of said solution and a turbulent stream of a non-solvent for said polycarbonate polymer, said non-solvent being maintained at a temperature which is maintained below the boiling point of the polycarbonate solvent, to form a mixture comprising solid polycarbonate polymer particles, solvent and non-solvent and thereafter separating said solid particles from said solvent and non-solvent.

2. The method of claim 1 wherein the polycarbonate solution is prepared by the phosgenation of bisphenol-A.

3. The method of claim 1 wherein the polycarbonate solution comprises from about 1 to about 40% by weight phenolphthalein polycarbonate polymer and the remainder solvent.

4. The method of claim 2 wherein the solvent is methylene chloride.

5. The method of claim 3 wherein the solvent is methylene chloride.

6. The method of claim 1 wherein said streams are contacted and sheared in the discharge chamber of a centrifugal pump.

7. The method of claim 4 wherein said streams are contacted and sheated in the discharge chamber of a centrifugal pump.

8. The method of claim 5 wherein said streams are contacted and sheared in the discharge chamber of a centrifugal pump.

* * * * *